United States Patent Office
3,651,099
Patented Mar. 21, 1972

3,651,099
PREPARATION OF MONOBENZAMIDO DERIVATIVES OF DIAMINOANTHRAQUINONE
Hans L. Perlinger, Toms River, and Joseph S. Milazzo, Dumont, N.J., assignors to GAF Corporation, New York, N.Y.
No Drawing. Filed Apr. 2, 1968, Ser. No. 718,198
Int. Cl. C09b 1/42
U.S. Cl. 260—377
14 Claims

ABSTRACT OF THE DISCLOSURE

A process for producing monoacylated derivatives of diaminoanthraquinones comprising reacting the diaminoanthraquinone with benzoyl chloride or a mixture of benzoic acid and an inorganic acid chloride in the presence of an N,N-dialkyl carboxylic acid amide.

---

The present invention is directed to a new and improved method of producing monoacylated derivatives of diaaminoanthraquinones and, more particularly, to such a new and improved method of producing monoacylated derivatives of 1,4-, 1,5-, or 1,8-diaminoanthraquinone in substantially quantitative yields.

Monoacylated derivatives of diaminoanthraquinones are well-known materials valuable as intermediate products in the production of vat and similar dyes employed in the dyeing industry. Thus, since only one of the two amino groups of the diaminoanthraquinone is acylated, the other amino group is free to take part in a number of reactions in the production of valuable dyestuffs. Thus, for example, it is known to employ the monoacylated diaminoanthraquinones in a reaction with a material such as cyanuric chloride to produce a valuable fiber-reactive dyestuff.

An exemplary prior art process for the production of monoacylated derivatives of diaminoanthraquinone comprises the reaction of 1,4- or 1,5-diaminoanthraquinone with benzoyl chloride in nitrobenzene. Such a reaction is conducted in order to acylate only one of the two amino groups of the diaminoanthraquinone while the other group remains unsubstituted and available for further reaction. Such a prior art process is shown, for example, in German Pat. Nos. 522,787 and 816,703, as well as U.S. Pat. 1,867,057. While such a process is effective in the production of some of the monoacylated products, the desired monoacylated diaminoanthraquinone is not obtained alone, but is obtained in a mixture with a diacylated diaminoanthraquinone and the unacylated starting material. Accordingly, the yield of the monoacylated anthraquinone is low, and any desired to obtain the monoacylated material as a pure compound requires complicated separation or extraction techniques. Accordingly, such processes have not been found commercially satisfactory in a production of desirable monoacylated diaminoanthraquinone.

An esential improvement over the conventional prior art processes for the production of monoacylated derivatives of diaminoanthraquinones is disclosed in German Pat. No. 1,061,793. This patent discloses that the yield of monoacylated diaminoanthraquinones can be increased by reacting the daminoanthraquinone with a carboxylic acid halide, e.g. benzoylchloride in the presence of saturated lactams, such as pyrrolidone, piperidone, caprolactam, capryllactam, or their N-alkyl derivatives. While such a process is to some extent effective in increasing the yield of a monoacylated diaminoanthraquinone, the process has certain distinct disadvantages associated with the employment of the saturated lactam. Thus, in accordance with the process disclosed in German Pat. 1,061,793, it is necessary to employ a great excess of lactam since the lactam acts both as a promoter of the monoacylation reaction as well as a solvent for the system. Accordingly, the employment of large excesses of the expensive saturated lactams makes the process disclosed in this German patent economically unsatisfactory.

Accordingly, it has long been the desire of the dyeing industry to provide a process for the production of monoacylated derivatives of diaminoanthraquinones which allows for the production of quantitative yields of the monoacylated derivatives in a simple, efficient, and economic manner. This has now been accomplished in accordance with the present invention.

It has now been unexpectedly discovered in accordance with the present invention that substantially quantitative yields of monoacylated derivatives of 1,4- 1,5-, or 1,8-diaminoanthraquinones or their substituted derivatives can be prepared by conducting the reaction of the diaminoanthraquinone with the acylating agent in the presence of stoichiometric or slightly higher than stoichiometric quantities of N,N-dialkyl carboxylic acid amides.

It is therefore a principal object of the present invention to provide a process for the production of monoacylated derivatives of diaminoanthraquinone, which process eliminates the inherent deficiencies and disadvantages of prior art processes.

A further object is to provide a process for the production of substantially quantitative yields of monoacylated derivatives of diaminoanthraquinones by conducting the reaction of the diaminoanthraquinone with the acylating agent in the presence of stoichiometric or slightly higher than stoichiometric quantities of an N,N-dialkyl carboxylic acid amide.

A still further object of the present invention is to provide a process for producing substantially quantitative yields of monoacylated derivatives of 1,4-, 1,5-, or 1,8-diaminoanthraquinones or their substituted derivatives by the reaction of an anthraquinone with an acylating material selected from carboxylic acid halides and mixtures of aromatic carboxylic acids with inorganic acid halides in the presence of stoichiometric or slightly higher than stoichiometric quantities of N,N-dialkyl carboxylic acid amides.

Still further objects and advantages of the process of the present invention will become more apparent from the following more detailed description of the present invention.

In accordance with the present invention it has now been discovered that substantially quantitative yields of monoacylated 1,4-, 1,5-, or 1,8-diaminoanthraquinones and their substituted derivatives can be prepared by reacting the appropriate diaminoathraquinone with the acylating reagent in the presence of a stoichiometric or slightly higher than a stoichiometric amount of an N,N-dialkyl carboxylic acid amide.

The N,N-dialkyl carboxylic acid amides employed in the process of the present invention are dialkyl-substituted derivatives of the following exemplary amides: formamide, acetamide, propionamide, n-butyramide, iso-butyramide, n-valeramide, caproamide, lauramide, and stearamide, etc.

The alkyl substituents of the N,N-dialkyl carboxylic acid amide employed in the process of the present invention are generally lower alkyl groups. Thus, for example, suitable alkyl substituents include: methyl, ethyl, n-propyl, iso-propyl, n-butyl, t-butyl, n-amyl, iso-amyl, and n-hexyl, etc.

Suitable N,N-dialkyl carboxylic acid amides to be employed in accordance with the process of the present invention include:

N,N-dimethyl formamide
N,N-ethyl methyl formamide
N,N-diethyl formamide
N,N-diisopropyl formamide
N,N-di-t-butyl formamide
N,N-di-n-amyl formamide
N,N-ethylisopropyl formamide
N,N-dimethyl acetamide
N,N-ethyl methyl acetamide
N,N-di-iso-propyl acetamide
N,N-di-n-amyl acetamide
N,N-ethyl-iso-propyl acetamide
N,N-dimethyl propionamide
N,N-ethyl methyl propionamide
N,N-di-t-butyl propionamide
N,N-dimethyl n-butyramide
N,N-ethyl methyl n-butyramide
N,N-diethyl n-butyramide
N,N-ethyl-iso-propyl n-butyramide
N,N-dimethyl isobutyramide
N,N-ethyl methyl iso-butyramide
N,N-di-iso-propyl iso-butyramide
N,N-ethyl methyl n-valeramide
N,N-diethyl n-valeramide
N,N-ethyl methyl caproamide
N,N-di-iso-propyl caproamide
N,N-di-t-butyl caproamide
N,N-ethyl iso-propyl caproamide
N,N-dimethyl lauramide
N,N-ethyl methyl lauramide
N,N-dimethyl stearamide
N,N-ethyl methyl stearamide
N,N-di-t-butyl stearamide, etc.

The acylation of the diaminoanthraquinone in the presence of the N,N-dialkyl carboxylic acid amide can be advantageously affected by the employment of a carboxylic acid halide and preferably an aromatic carboxylic acid halide. Suitable materials for this purpose include, for example, benzoyl chloride, benzoyl bromide, and substiution products thereof. In this reaction, the diaminoanthraquinone and the acylating agent, e.g. benzoyl chloride, are generally employed in substantially stoichiometric amounts so as to affect the monoacylation of the diaminoanthraquinone. As noted previously, the N,N-dialkyl carboxylic acid amide employed in the process of the present invention need only be employed in an amount stoichiometrically equivalent to the amount of diaminoanthraquinone or in an amount slightly higher than such stoichiometric equivalent. Generally, a stoichiometric excess of from about 10% to about 50% of the N,N-dialkyl carboxylic acid amide based upon the diaminoanthraquinone starting material is utilized. While this amount of N,N-dialkyl carboxylic acid amide is capable of promoting the monoacylation of the diaminoanthraquinone, it is of course obvious that greater excesses of this material can be utilized where desired, the limitation relative to the excess amount of material being one based only upon economics. Accordingly, larger excesses of the N,N-dialkyl carboxylic acid amide do not adversely affect the yield or purity of the monoacylated diaminoanthraquinone.

The process of the present invention is advantagtous in that it requires no acid binding agent as employed in some previous prior art processes, and in addition readily proceeds to completion at or about room temperature. Thus, the process of the present invention can be generally conducted at a temperature of from 20° C. to about 100° C., the temperature of reaction not being critical. Accordingly, lower or higher temperatures can be advantageously utilized where desired. Generally, ambient conditions are utilized.

While the process of the present invention will proceed satisfactorily to completion to provide a substantially quantitative yield of the monoacylated 1,4-, 1,5-, or 1,8-diaminoanthraquinone without the employment of any additional solvent, an inert organic solvent can be employment of any additional solvent, an inert organic solvent can be employed in an optional embodiment of the present invention. Thus, for example, an inert organic solvent such as nitro-benzene, ortho-dichlorobenzene, etc. can be advantageously employed in the reaction medium.

As noted previously, the process of the present invention is one in which substantially quantitative yields of the monoacylated diaminoanthraquinone are produced. Thus, in the process of the present invention substantially no diacylated product is formed. Since the monoacylated diaminoanthraquinone precipitates out from any excess reaction medium it is a simple procedure to extract the desired product from the reaction system. This can be done by any conventional separation technique.

In accordance with a further embodiment of the present invention we have found that the monoacylation reaction proceeds equally rapidly and satisfactorily to produce a substantially quantitative yield of the monoacylated diaminoanthraquinone by employing an acylation system comprising in admixture an aromatic carboxylic acid, e.g. benzoic acid or its derivatives, and an inorganic acid halide, e.g. an inorganic acid chloride. This reaction, again, is conducted in the presence of an N,N-dialkyl carboxylic acid amide, it being hypothesized that the inorganic acid halide forms a primary addition product with the amide in the promotion of the acylation reaction.

Suitable inorganic halides to be employed in this embodiment of the present invention include as representative examples:

thionyl chloride
phosphorus oxychloride
phosgene
phosphorus pentachloride
phosphorus trichloride
nitrosyl chloride, etc.

In accordance with this embodiment of the present invention, the amounts of reactants, as well as the conditions of the reaction, are the same as set forth above with respect to the empolyment of an organic acid halide in the monoacylation reaction.

The following specific examples illustrate various embodiments of the present invention. It is to be noted, however, that such examples are presented for purposes of illustration only, and the present invention is in no way to be deemed as limited thereto.

Unless otherwise specified, parts mentioned in the following examples are parts by weight.

EXAMPLE 1

A mixture of 18 parts benzoylchloride and 25 parts o-dichlorobenzene is added at 25° C. under agitation into a mixture of 475 parts o-dichlorobenzene, 24 parts 1,5-diaminoanthraquinone and 9 parts N,N-dimethylformamide. The mixture is stirred for 2 hours at room temperature; the precipitated reaction product is sucked off and washed with 50 parts acetone, after which it is slurried in 200 parts of 15% (weight percent) aqueous soda ash solution at room temperature. The reaction product is then sucked off, washed neutral with plain water and dried. Some 29 parts of 1-amino, 5-benzamidoanthraquinone in the form of dark red crystals are obtained.

EXAMPLE 2

A mixture of 28 parts benzoylchloride and 40 parts o-dichlorobenzene is added to a mixture of 36 parts 1,4-diaminoanthraquinone and 14 parts N,N-dimethylformamide in 600 parts o-dichlorobenzene. The reaction mixture is stirred for 2 hours at 25°–30° C. and any impurities which may be present are removed by filtration. The residue is steam-stripped until all of the solvent has been removed and the reaction product has turned a violet red color. After filtration and drying 43 parts of 1-amino, 4-benzamidoanthraquinone are obtained.

EXAMPLE 3

The process of Example 2 was repeated, employing in lieu of the N,N-dimethylformamide substantially equivalent amounts of the following compounds:

(a) N,N-ethyl methyl formamide
(b) N,N-diethyl formamide
(c) N,N-di-t-butyl formamide
(d) N,N-dimethyl acetamide
(e) N,N-di-n-amyl formamide
(f) N,N-di-methyl propionamide
(g) N,N-di-ethyl n-butyramide
(h) N,N-di-iso-propyl isobutyramide
(i) N,N-ethyl methyl n-valeramide
(j) N,N-ethyl iso-propyl caproamide
(k) N,N-dimethyl stearamide In all cases, the yield of the desired monoacylated diaminoanthraquinone was substantially quantative.

EXAMPLE 4

A mixture of 25 parts thionylchloride and 50 parts o-dichlorobenzene is added into a mixture of 24 parts 1,5-diaminoanthraquinone, 13 parts benzoic acid and 9 parts N,N-dimethylformamide in 450 parts o-dichlorobenzene with stirring. After another 2 hours of stirring at room temperature the precipitated reaction product is sucked off. The dark brown product is steam-stripped until all of the accompanying o-dichlorobenzene is evaporated and the product has turned a dark red color. On filtration and drying 30 parts of 1-amino, 5-benzamidoanthraquinone are obtained.

EXAMPLE 5

Some 25 parts thionylchloride are added into a mixture of 380 parts N,N-dimethylformamide, 24 parts 1,5-diaminoanthraquinone and 13 parts benzoic acid at room temperature. After 2 hours' stirring at room temperature the total mixture is drowned into 1000 parts water. The precipitate is sucked off and steam-stripped for 5 hours. On filtration and drying 29 parts of 1-amino, 5-benzamido anthraquinone are obtained.

EXAMPLE 6

When Example 4 is repeated, utilizing substantially equivalent amounts of the following inorganic acid halides in lieu of thionylchloride, substantially equivalent results are obtained.

(a) phosphorus oxychloride
(b) phosphorus pentachloride
(c) nitrosyl chloride

EXAMPLE 7

Substantially equivalent yields of 1-amino, 5-benzamidoanthraquinone are obtained when Example 5 is repeated employing the following N,N-dialkyl carboxylic acid amides in lieu of N,N-dimethyl formamide:

(a) N,N-ethyl methyl formamide
(b) N,N-diethyl formamide
(c) N,N-di-t-butyl formamide
(d) N,N-dimethyl acetamide
(e) N,N-di-n-amyl formamide
(f) N,N-di-methyl propionamide
(g) N,N-di-ethyl n-butyramide
(h) N,N-di-iso-propyl isobutyramide
(i) N,N-ethyl methyl n-valeramide
(j) N,N-ethyl iso-propyl caproamide
(k) N,N-dimethyl stearamide While the present invention has been described primarily with respect to the foregoing specific exemplification, it is to be understood that the present invention is in no way to be deemed as limited thereto, but should be construed as broadly as any or all equivalents thereof.

We claim:

1. A process for the monoacylation of 1,4-, 1,5- or 1,8-diaminoanthraquinone which comprises reacting same with a substantially stoichiometric amount of a benzoyl halide or a mixture of benzoic acid and an inorganic acid halide selected from the group consisting of thionyl chloride, phosphorus oxychloride, phosgene, phosphorus pentachloride, phosphorus trichloride, and nitrosyl chloride, in the presence of an N,N-di-lower alkyl amide of a $C_{1-18}$ aliphatic carboxylic acid employed in an amount ranging from about stoichiometric up to about 50% in excess thereof based on said diaminoanthraquinone.

2. A process as defined in claim 1 wherein said amide is N,N-dimethylformamide.

3. The process of claim 1 wherein said N,N-di-lower alkyl amide is employed in a 10–50% stoichiometric excess based on said diaminoanthraquinone.

4. The process of claim 3 wherein said process is carried out under ambient conditions.

5. A process for the monoacylation of 1,4-, 1,5- or 1,8-diaminoanthraquinone which comprises reacting said diaminoanthraquinone with a substantially stoichiometric amount of a benzoyl halide in the presence of an N,N-di-lower alkyl amide of a $C_{1-18}$ aliphatic carboxylic acid employed in an amount ranging from about stoichiometric up to about 50% in excess thereof based on said diaminoanthraquinone.

6. A process as defined in claim 5 wherein said amide is N,N-dimethylformamide.

7. The process of claim 5 wherein said halide is benzoyl chloride.

8. The process of claim 7 wherein said N,N-di-lower alkyl amide is employed in a 10–50% stoichiometric excess based on said diaminoanthraquinone.

9. The process of claim 8 wherein said process is carried out under ambient conditions.

10. A process for the monoacylation of 1,4-, 1,5- or 1,8-diaminoanthraquinone which comprises reacting same with at least a stoichiometric amount of a mixture of benzoic acid and an inorganic acid halide selected from the group consisting of thionyl chloride, phosphorus oxychloride, phosgene, phosphorus pentachloride, phosphorus trichloride, and nitrosyl chloride, in the presence of an N,N-di-lower alkyl amide of a $C_{1-18}$ aliphatic carboxylic acid employed in an amount ranging from about stoichiometric up to about 50% in excess thereof based on said diaminoanthraquinone.

11. A process as defined in claim 10 wherein said amide is N,N-dimethylformamide.

12. A process as defined in claim 10 wherein said halide is thionyl chloride.

13. The process of claim 10 wherein said N,N-di-lower alkyl amide is employed in a 10–50% stoichiometric excess based on said diaminoanthraquinone.

14. The process of claim 13 wherein said process is carried out under ambient conditions.

References Cited

UNITED STATES PATENTS

| | | | |
|---|---|---|---|
| 2,567,821 | 9/1951 | Moergeli | 260—377 |
| 2,965,653 | 12/1960 | Bloom et al. | 260—377 |
| 2,982,773 | 5/1961 | Grossmann | 260—377 |
| 3,149,155 | 9/1964 | Seefelder et al. | 260—544 |
| 3,277,119 | 10/1966 | Beyer et al. | 260—377 |

OTHER REFERENCES

Raphael et al., Advances in Organic Chemistry, vol. 5, page 39 (1965).

Savinov, as cited in Chem. Abstracts, 63, p. 10074 (1965).

LORRAINE A. WEINBERGER, Primary Examiner

E. J. SKELLY, Assistant Examiner